(12) United States Patent
Fujishiro (10) Patent No.: US 11,368,888 B2
(45) Date of Patent: Jun. 21, 2022

(54) MOBILE COMMUNICATION SYSTEM AND APPARATUS (71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 96 days.

(21) Appl. No.: 16/881,882

(22) Filed: May 22, 2020

(65) Prior Publication Data
US 2020/0288363 A1 Sep. 10, 2020

Related U.S. Application Data (63) Continuation of application No. PCT/JP2018/042823, filed on Nov. 20, 2018.

(30) Foreign Application Priority Data

Nov. 24, 2017 (JP) .............................. JP2017-225591

(51) Int. Cl.
H04W 4/00 (2018.01)
H04W 36/08 (2009.01)
(52) U.S. Cl.
CPC .................... H04W 36/08 (2013.01)
(58) Field of Classification Search
CPC ...... H04W 36/08; H04W 88/18; H04M 11/00
USPC .......................................... 370/331; 455/312
See application file for complete search history.

(56) References Cited

U.S. PATENT DOCUMENTS

2012/0106346 A1* 5/2012 Aguirre .............. H04W 28/08
370/237
2019/0028934 A1* 1/2019 Rasanen .............. H04W 36/12
2019/0174369 A1 6/2019 Tomikawa et al.

FOREIGN PATENT DOCUMENTS

| JP | 2017-055257 A | 3/2017 |
| WO | 2017/127102 A1 | 7/2017 |
| WO | 2017/129742 A1 | 8/2017 |
| WO | 2018/042572 A1 | 3/2018 |

OTHER PUBLICATIONS

Mobile Edge Computing (MEC); Framework and Reference Architecture, ETSI GS MEC 003 vol. 1.1.1, Mar. 31, 2016, sections 6-7, A.1.
Mobile Edge Computing (MEC); Technical Requirements, ETSI GS 7, 9-10, MEC 002 vol. 1.1.1, Mar. 31, 2016, sections A.5, A.6.

* cited by examiner

Primary Examiner — Marcos Batista
(74) Attorney, Agent, or Firm — Studebaker & Brackett PC (57) ABSTRACT A mobile communication system comprises a user equipment configured to perform a radio communication with a mobile communication network, a plurality of nodes including a proxy target node provided on the mobile communication network and configured to execute a proxy process of executing a calculation process of an application used by the user equipment on behalf of the user equipment. The switching information used for a switching process switching the proxy target node from a first node to a second node is notified to at least one of the first node, the second node, and the user equipment.

16 Claims, 7 Drawing Sheets

MOBILE COMMUNICATION SYSTEM AND APPARATUS

RELATED APPLICATIONS

The present application is a continuation based on PCT Application No. PCT/JP2018/042823, filed on Nov. 20, 2018, which claims the benefit of Japanese Patent Application No. 2017-225591 (filed on Nov. 24, 2017). The content of which is incorporated by reference herein in their entirety.

TECHNICAL FIELD

The present disclosure relates to a mobile communication system and an apparatus used in the mobile communication system.

BACKGROUND ART

Mobile edge computing (MEC) is under study as one of the architectures of the next-generation radio infrastructure (for example, see Non Patent Literature 1). According to the MEC architecture, a node (hereinafter, referred to as "proxy target node") that executes a proxy process of executing a calculation process of an application used by the user equipment on behalf of the user equipment is provided on a mobile communication network.

According to MEC, the proxy target node is located at a position with a short communication distance from the user equipment. Thus, a smaller communication delay and a smaller traffic amount between the proxy target node and the Internet can be achieved compared with an architecture (that is, a general cloud computing) having the target proxy node provided on the Internet.

CITATION LIST

Non Patent Literature

Non Patent Literature 1: "Mobile-edge Computing Introductory Technical White Paper", September 2014, <URL: https://portal.etsi.org/Portals/0/TBpages/MEC/Docs/Mobile-edge_Computing_-_Introductory_Technical_White_Paper_V1%2018-09-14.pdf>

SUMMARY

A mobile communication system according to one embodiment comprises a user equipment configured to perform a radio communication with a mobile communication network, a plurality of nodes including a proxy target node provided on the mobile communication network and configured to execute a proxy process of executing a calculation process of an application used by the user equipment on behalf of the user equipment, and a notificator configured to notify at least one of a first node, a second node, and the user equipment of switching information used for a switching process of switching the proxy target node from the first node to the second node.

An apparatus according to one embodiment is used in a mobile communication system including a user equipment configured to perform a radio communication with a mobile communication network and a plurality of nodes including a proxy target node provided on the mobile communication network and configured to execute a proxy process of executing a calculation process of an application used by the user equipment on behalf of the user equipment. The apparatus comprises a notificator configured to notify at least one of a first node, a second node, and the user equipment of switching information used for a switching process for switching the proxy target node from the first node to the second node.

A mobile communication system according to one embodiment comprises a user equipment configured to perform a radio communication with a mobile communication network, a proxy target node provided on the mobile communication network and configured to execute a proxy process of executing a calculation process of an application used by the user equipment on behalf of the user equipment, and a notificator configured to notify at least one of the proxy target node and the user equipment of selection information used for selecting whether the calculation process is executed by the user equipment or the proxy process is executed by the proxy target node.

An apparatus according to one embodiment is used in a mobile communication system including a user equipment configured to perform a radio communication with a mobile communication network, and a proxy target node provided on the mobile communication network and configured to execute a proxy process of executing a calculation process of an application used by the user equipment on behalf of the user equipment. The apparatus comprises a notificator configured to notify at least one of the proxy target node and the user equipment of selection information used for selecting whether the calculation process is executed by the user equipment or the proxy process is executed by the proxy target node.

DESCRIPTION OF EMBODIMENTS

The present disclosure provides a mobile communication system and an apparatus with which a proxy process for an application in MEC can be appropriately controlled.

An embodiment of the present invention will be described with reference to the drawings. In the description of the drawings, the same or similar parts are denoted by the same or similar reference numerals.

(1) First Embodiment

(1.1) Configuration of Mobile Communication System

Figure 1:
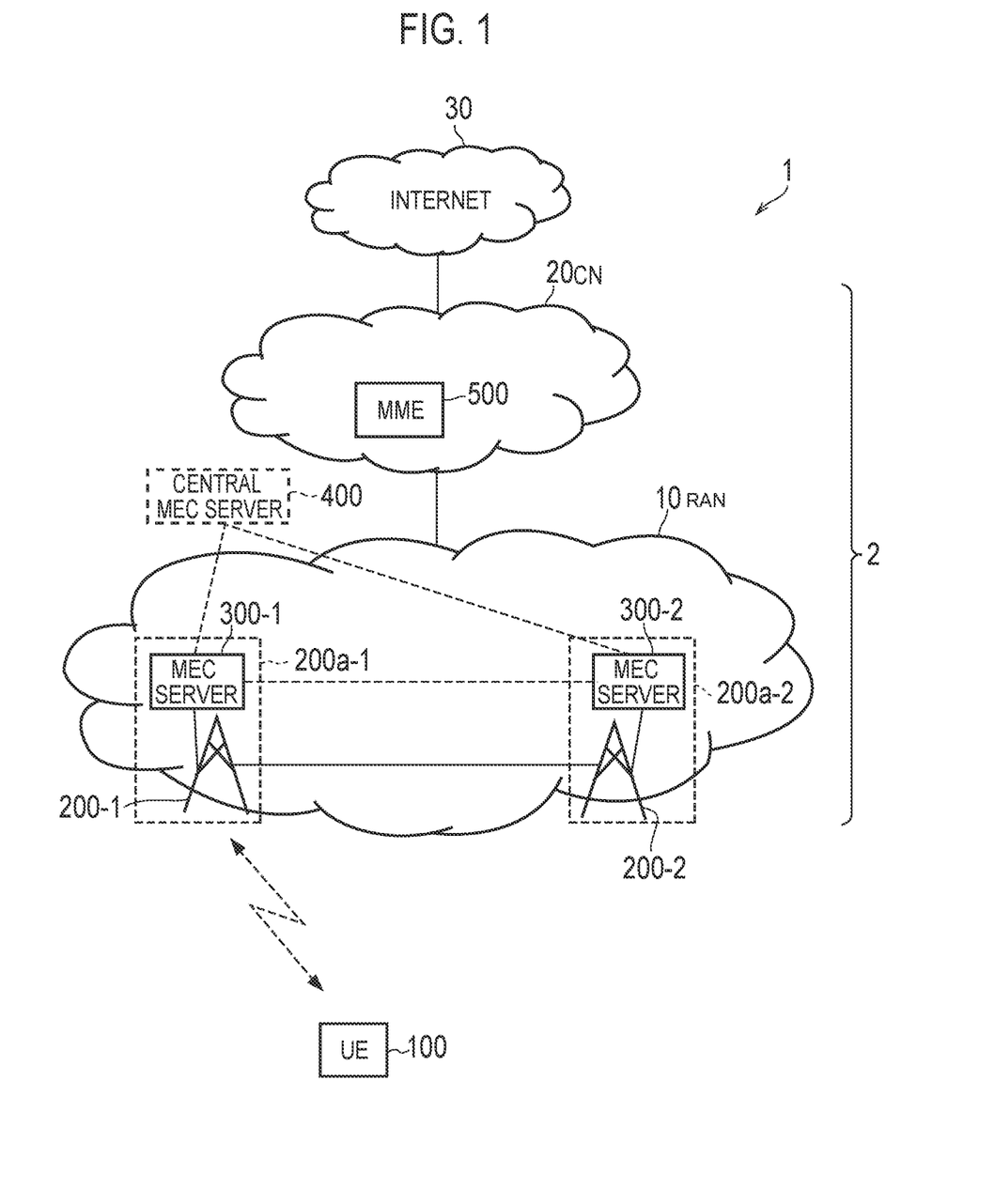
FIG. 1 is a diagram illustrating a configuration of a mobile communication system according to an embodiment.

A configuration of a mobile communication system according to a first embodiment will be described. FIG. 1 is a diagram illustrating a configuration of a mobile communication system 1 according to the first embodiment. The mobile communication system 1 has a configuration based on the 3GPP standard. In the first embodiment, an example in which the mobile communication system 1 is a long term evolution (LTE) system will be described.

As illustrated in FIG. 1, the mobile communication system 1 includes a mobile communication network 2, the Internet 30, and a user equipment (UE) 100. The mobile communication network 2 is a network between the UE 100 and the Internet 30. The mobile communication network 2 provides a mobile communication service to the UE 100. The mobile communication network 2 includes a radio access network (RAN) 10 and a core network (CN) 20. The RAN 10 is a network for performing radio communication with the UE 100. The RAN 10 includes base stations 200 and MEC servers 300.

The base stations 200 are connected to each other via an X2 interface that is an interface between base stations. In the example illustrated in FIG. 1, a base station 200-1 is connected to a base station 200-2, in neighbouring relationship with the base station 200-1, via the X2 interface. The base station 200 has a radio resource management (RRM) function, a routing function for user data (hereinafter simply referred to as "data"), a measurement control function for mobility control/scheduling, and the like. The base station 200 manages one or a plurality of cells. The term "cell" is used to indicate the minimum unit of a radio communication area. The "cell" may be used to indicate a function or resource for performing radio communication with the UE 100. One cell belongs to one carrier frequency.

The MEC server 300 executes a proxy process of executing a calculation process of an application used by the UE 100 on behalf of the UE 100. The application used by the UE 100 is an internet of things (IoT) application or the like. The IoT application is an application that executes, for example, a statistical process on sensor data collected by the UE 100. When the UE 100 is an IoT apparatus, the processing capability of the UE 100 is low meaning that an advanced calculation process can be implemented with the MEC server 300 executing the proxy process. The calculation process may be, for example, a statistical process or processes of the entire program (a series of processes). The IoT application may be a connected car application. The connected car application is, for example, an application that performs various controls and managements on the vehicle based on sensor data collected by the UE 100. Such applications require low-latency communications.

In the example illustrated in FIG. 1, one MEC server 300 is provided to one base station 200. The MEC server 300 may be integrated with the base station 200 or may be installed at the same location as the base station 200. In such a case, the base station 200 can be regarded as a base station having the functionality of the MEC server 300. The base station having the functionality of the MEC server 300 is referred to as "MEC base station 200a". The MEC base station 200a can execute the proxy process at a position with the shortest communication distance from the UE 100 in the mobile communication network 2, so that communication delay can be significantly reduced from that with general cloud computing.

Alternatively, the MEC server 300 may be provided separately from base station 200 and installed at a location different from that of the base station 200. In such a case, one MEC server 300 is not limited to being provided for one base station 200, and may be provided for a plurality of base stations 200. Furthermore, the MEC server 300 is not limited to being provided on the RAN 10, but may be provided on the CN 20. Furthermore, an interface (hereinafter, referred to as an "inter-MEC server interface") may be provided between the MEC servers 300. In the example illustrated in FIG. 1, the inter-MEC server interface is set up between an MEC server 300-1 corresponding to the base station 200-1 and an MEC server 300-2 corresponding to the base station 200-2.

The MEC server 300 may be connected to a central MEC server 400. The central MEC server 400 is a server that manages a plurality of the MEC servers 300. The central MEC server 400 may be provided on the RAN 10 or may be provided on the CN 20.

The CN 20 is a network between the RAN 10 and the Internet 30. The CN 20 includes a mobility management entity (MME) 500. The MME 500 performs various types of mobility control and the like for the UE 100. The MME 500 manages information on the tracking area (TA) in which the UE 100 exists by communicating with the UE 100 using non-access stratum (NAS) signaling. The tracking area is an area including a plurality of cells.

The UE 100 performs radio communication with the base station 200. The UE 100 uses an application such as an IoT application. The UE 100 may be any apparatus that performs radio communications with the base station 200, and may be a sensor or an apparatus provided on the sensor, a vehicle or an apparatus provided on the vehicle, a flying object (drone) or an apparatus (such as a module) provided on the flying object, or a mobile phone. The UE 100 needs to switch the base station 200 (cell) that performs the radio communication with the UE 100 due to, for example, a movement of the UE 100. Such a switching process is referred to as "handover" when the UE 100 is in a radio resource control (RRC) connected mode, and is referred to as "cell reselection" when the UE 100 is in an RRC idle mode. The UE 100 is in the RRC connected mode when connection (RRC connection) is established between the RRC of the UE 100 and the RRC of the base station 200. The UE 100 is in the RRC idle mode when no connection (RRC connection) is established between the RRC of the UE 100 and the RRC of the base station 200.

Figure 2:
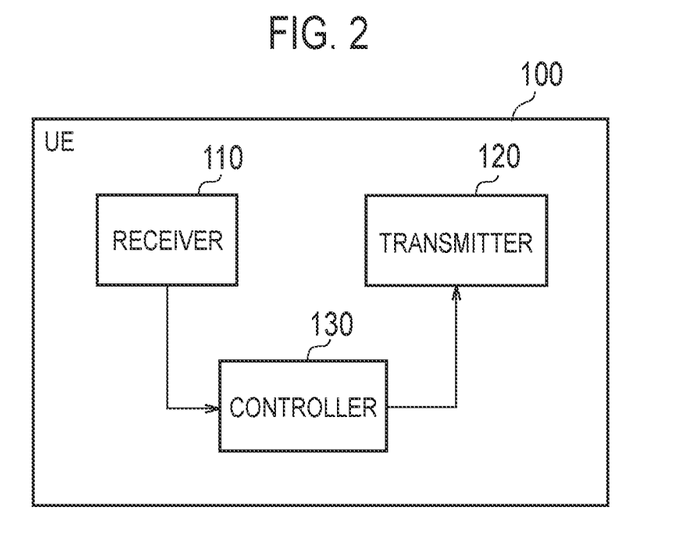
FIG. 2 is a diagram illustrating a configuration of a user equipment (UE) according to the embodiment.

FIG. 2 is a diagram illustrating a configuration of the UE 100 (user equipment). The UE 100 includes a receiver 110, a transmitter 120, and a controller 130.

The receiver 110 performs various types of reception under the control of the controller 130. The receiver 110 includes an antenna and a receiving unit. The receiving unit converts a radio signal received by the antenna into a baseband signal (reception signal) and outputs this signal to the controller 130.

The transmitter 120 performs various types of transmission under the control of the controller 130. The transmitter 120 includes an antenna and a transmitting unit. The transmitting unit converts a baseband signal (transmission signal) output from the controller 130 into a radio signal and transmits the radio signal through the antenna.

The controller 130 performs various types of control in the UE 100. The controller 130 includes at least one processor and memory. The memory stores a program executed by the processor and information used by the processor for executing processes. The processor may include a baseband processor and a central processing unit (CPU). The baseband processor performs modulation/demodulation, encoding/decoding, and the like for the baseband signal. The CPU executes various processes by executing a program stored in the memory. The processor executes processes described below.

Figure 3:
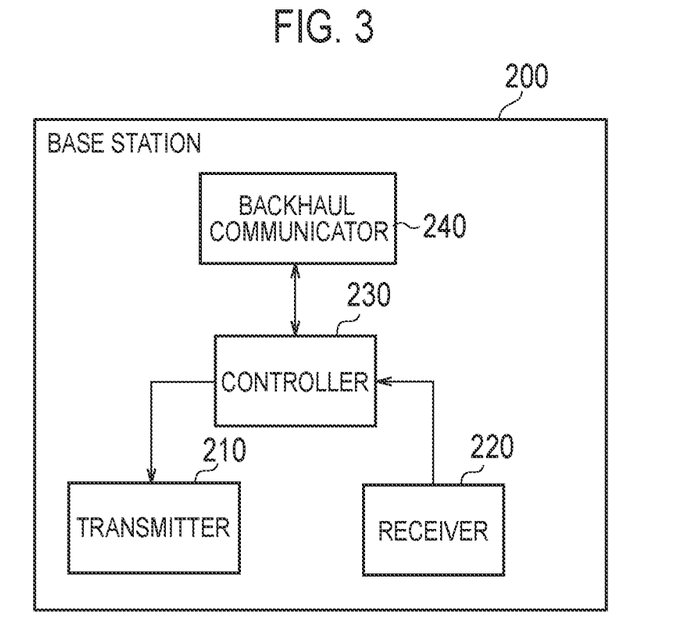
FIG. 3 is a diagram illustrating a configuration of a base station 200 according to the embodiment.

FIG. 3 is a diagram illustrating a configuration of the base station 200. The base station 200 includes a transmitter 210, a receiver 220, a controller 230, and a backhaul communication unit 240.

The transmitter 210 performs various types of transmission under the control of the controller 230. The transmitter 210 includes an antenna and a transmitting unit. The transmitting unit converts a baseband signal (transmission signal) output from the controller 230 into a radio signal and transmits the radio signal through the antenna.

The receiver 220 performs various types of reception under the control of the controller 230. The receiver 220 includes an antenna and a receiving unit. The receiving unit converts a radio signal received by the antenna into a baseband signal (reception signal) and outputs this signal to the controller 230.

The controller 230 performs various types of control in the base station 200. The controller 230 includes at least one processor and memory. The memory stores a program executed by the processor and information used by the processor for executing processes. The processor may include a baseband processor and a CPU. The baseband processor performs modulation/demodulation, encoding/decoding, and the like for the baseband signal. The CPU executes various processes by executing a program stored in the memory. The processor executes processes described below.

The backhaul communication unit 240 is connected to a neighbouring eNB via the X2 interface. The backhaul communication unit 240 is connected to the MME 500 via an S1 interface. The backhaul communication unit 240 is used for communications performed on the X2 interface, communications performed on the S1 interface, and the like.

When the base station 200 is an MEC base station, the controller 230 implements the functionality of the MEC server 300. When the base station 200 is not an MEC base station, the backhaul communication unit 240 is used for communications with the MEC server 300.

(1.2) Operation of Mobile Communication System

In the mobile communication system 1 illustrated in FIG. 1, a scenario is assumed in which the UE 100 in the RRC connected mode performs radio communication with the MEC base station 200a-1 (first node), and then the UE 100 is handed over from the MEC base station 200a-1 to the MEC base station 200a-2 (second node). In such a scenario, before the handover, the MEC base station 200a-1 executes a proxy process of executing a calculation process of an application used by the UE 100 on behalf of the UE 100. Such handover is an example of a switching process for switching a proxy target node that executes a proxy process from the first node to the second node.

Due to various factors, the MEC base station 200a-2 may not be able to execute the proxy process that is the same as that executed before the handover. An example of such factors include an increase in the processing load of the proxy process in the MEC base station 200a-2 (for example, an increase in the processing load of the MEC server 300-2 corresponding to the MEC base station 200a-2). Such factors include another factor that the MEC base station 200a-2 has no capability to execute the calculation process of the application used by the UE 100 (for example, doe to the application not being installed in the MEC base station 200a-2).

Hereinafter, operation patterns 1 and 2 according to the first embodiment will be described. The following operation patterns may be implemented independently, or the operation patterns 1 and 2 may be implemented in combination.

(1.2.1) Operation Pattern 1

Figure 4:
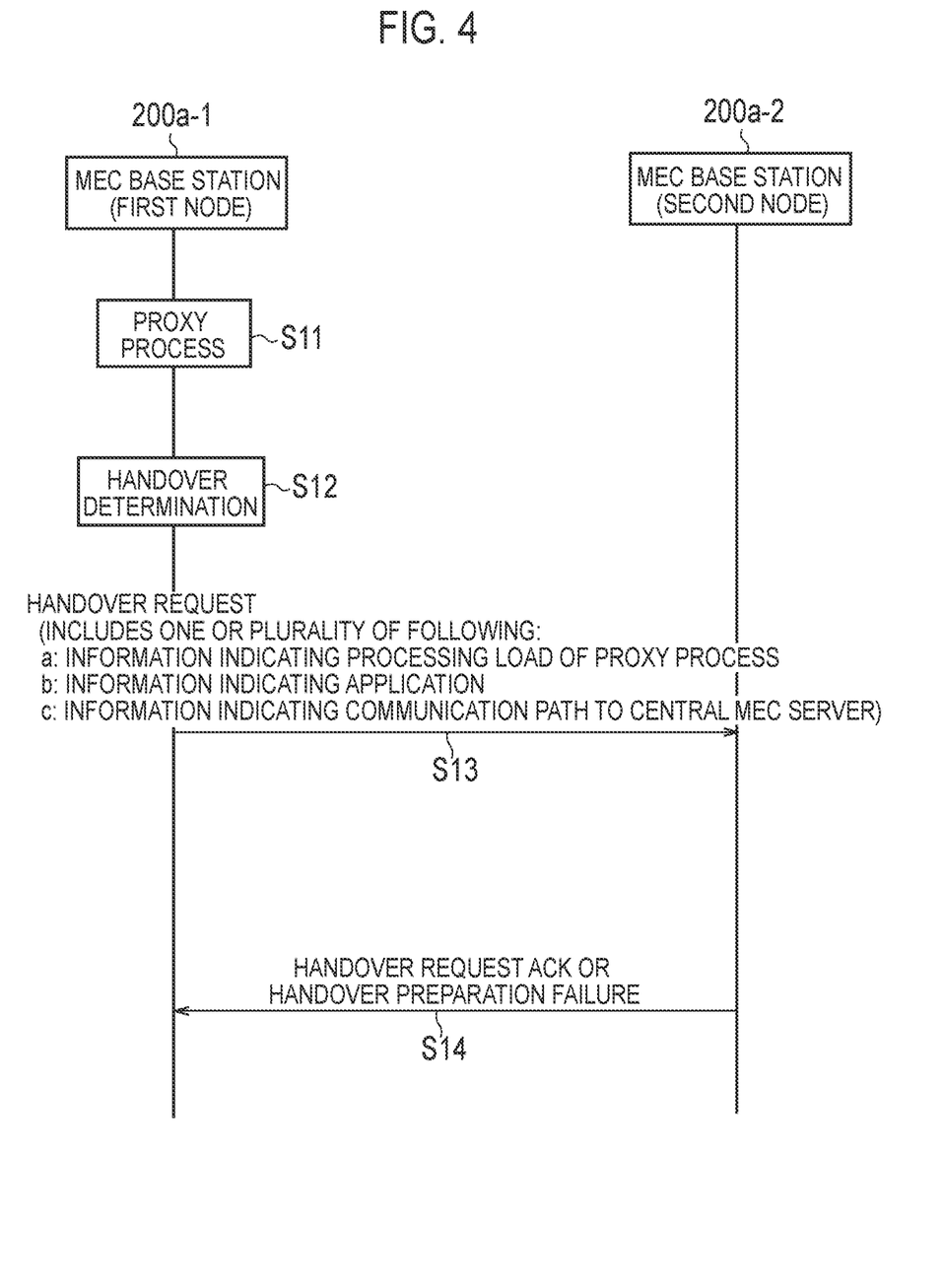
FIG. 4 is a diagram illustrating an operation pattern 1 according to the first embodiment.

FIG. 4 is a diagram illustrating the operation pattern 1 according to the first embodiment.

As illustrated in FIG. 4, in step S11, the MEC base station 200a-1 executes a proxy process of executing a calculation process of an application used by the UE 100 on behalf of the UE 100.

In step S12, the MEC base station 200a-1 makes determination to perform handover of the UE 100 to the MEC base station 200a-2, based on a measurement report from the UE 100 for example. The MEC base station 200a-1 starts a handover procedure upon making the determination to perform the handover.

In step S13, the MEC base station 200a-1 transmits a handover request (Handover Requet) message, for handover of the UE 100, to the MEC base station 200a-2 on the X2 interface. The handover request message from the MEC base station 200a-1 includes at least one of the following pieces of information (information elements) a) to c). The following pieces of information a) to c) are examples of switching information. In the operation pattern 1 according to the first embodiment, the controller 230 of the MEC base station 200a-1 corresponds to a notificator that notifies switching information.

a) Information Indicating Processing Load of the Proxy Process in the MEC Base Station 200a-1

The processing load includes a radio resource load, a communication load on the backhaul side, and a hardware load. The information indicating the processing load of the proxy process in the MEC base station 200a-1 may be information indicating the level of the load, corresponding to any of these loads, as a result of the proxy process. Such information may be an average value of the processing load or a maximum value of the processing load. Note that, as the information indicating the hardware load, a CPU clock frequency and/or a memory amount necessary for the proxy process may be used.

The MEC base station 200a-2 determines whether or not the MEC base station 200a-2 can take over the proxy process based on the information. For example, the MEC base station 200a-2 may determine the tolerable processing load for the proxy process based on the current load status of the MEC base station 200a-2, and determine that the MEC base station 200a-2 can take over the proxy process to accept the handover when the processing load of the proxy process notified from the MEC base station 200a-1 does not exceed the tolerable processing load for the proxy process. On the other hand, it may be determined that the proxy process cannot be taken over and the handover may be rejected, when the processing load of the proxy process notified from the MEC base station 200a-1 exceeds the tolerable processing load for the proxy process.

b) Information Indicating the Application Used by UE 100

Such information is, for example, identification information (application ID or application name) of an application used by the UE 100, and indicates an application for which a proxy process is required to be executed.

The MEC base station 200a-2 determines whether or not the MEC base station 200a-2 can take over the proxy process based on the information. For example, the MEC base station 200a-2 holds a list of applications installed therein, and determines whether or not the identification information about the application notified from the MEC base station 200a-1 is included in the list. When the identification information about the application notified from the MEC base station 200a-1 is included in the list, the MEC base station 200a-2 may determine that the MEC base station 200a-2 can take over the proxy process to accept the handover. On the other hand, when the identification information of the application notified from the MEC base station 200a-1 is not included in the list, the MEC base station 200a-2 may determine that the MEC base station 200a-2 cannot take over the proxy process to reject the handover.

Alternatively, the MEC base station 200a-1 may provide a program code of the application used by the UE 100 to the MEC base station 200a-2. Such a program code may be provided as an executable file that does not need to be installed. When the program code is provided from the MEC base station 200a-1, the MEC base station 200a-2 may determine that the MEC base station 200a-2 can take over the proxy process to accept the handover.

c) Information Indicating Communication Path to Central MEC Server 400

Such information is, for example, at least one of the IP address, URL, and host name (computer name) of the central MEC server 400. The MEC base station 200a-2 can access the central MEC server 400 based on the information, and execute the proxy process in cooperation with the central MEC server 400. Note that the MEC base station 200a-2 executes the proxy process in cooperation with the central MEC server 400 may mean that the central MEC server 400 executes a part of the proxy process or performs all of the proxy process with the MEC base station 200a-2 not executing the part of the proxy process or not executing the proxy process at all. In this case, even when the information a) and/or b) included in the handover request indicates that the handover should be determined to be rejected, the MEC base station 200a-2 may accept the handover when the information c) is included in the handover request. Thus, when the handover request includes the information c) in addition to the information of a) and/or b), the MEC base station 200a-2 may accept the handover with the information c) included without making determination based on the information a) and/or b). Furthermore, the information c) may include, in addition to the information indicating the communication path to the central MEC server 400, information indicating the processing capability of the central MEC server 400 for the proxy process (such as identification information about the application for which the central MEC server 400 can execute the proxy process and processing capability for the proxy process). In this case, even when the handover is to be rejected due to a reason such as the proxy process cannot be executed with the processing capability of the MEC base station 200a-2 alone and the corresponding application as indicated by the information a) and/or b), the MEC base station 200a-2 may accept the handover upon determining that the proxy process can be executed in cooperation with the central MEC server 400 based on the information c) including the information indicating the processing capability of the central MEC server 400.

In step S14, the MEC base station 200a-2 transmits a message, indicating that the UE 100 is or is not acceptable, to the MEC base station 200a-1 on the X2 interface. For example, when accepting the handover, the MEC base station 200a-2 transmits a Handover Request Ack message indicating that the handover is accepted. When rejecting the handover, the MEC base station 200a-2 transmits a Handover Preparation Failure message indicating that the handover is rejected. The Handover Preparation Failure message from the MEC base station 200a-2 may include information indicating the factor that has lead to the rejection of the handover. Such a factor include an increase in the processing load of the proxy process in the MEC base station 200a-2 and the MEC base station 200a-2 not having capability to execute the calculation process of the application used by the UE 100.

Upon receiving the Handover Request Ack message, the MEC base station 200a-1 instructs UE 100 to perform handover to the MEC base station 200a-2.

(1.2.2) Operation Pattern 2

Figure 5:
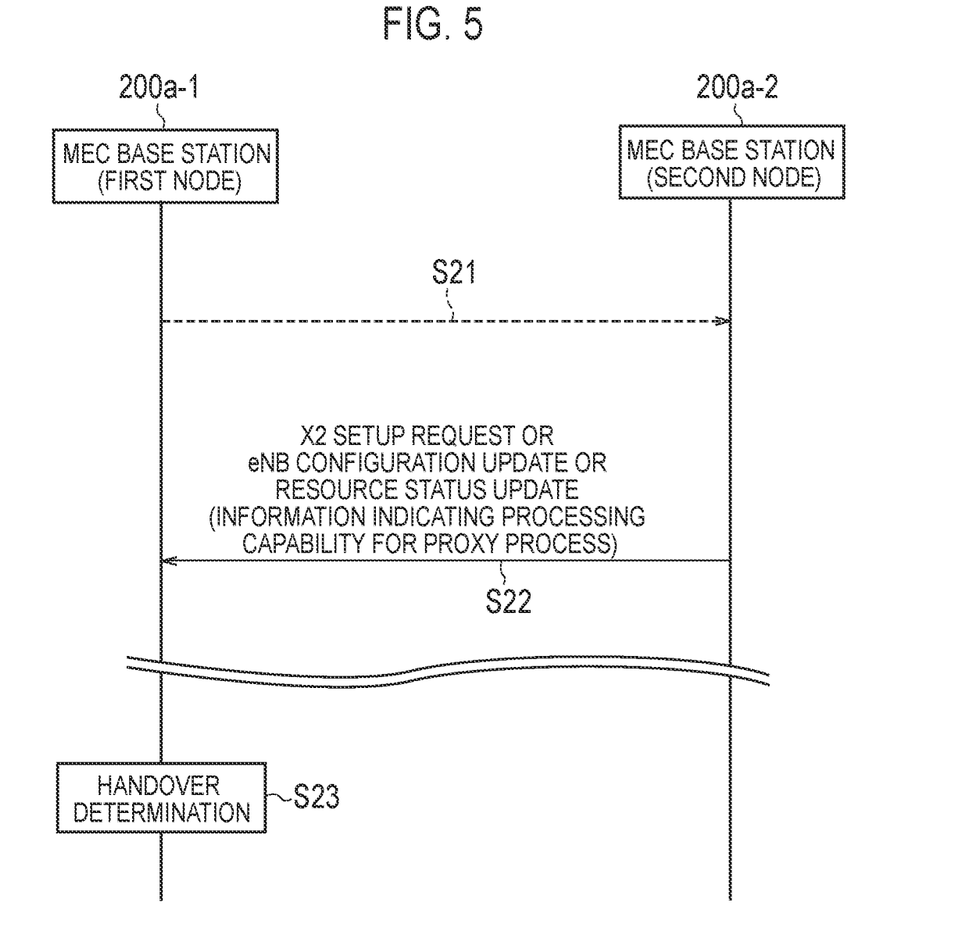
FIG. 5 is a diagram illustrating an operation pattern 2 according to the first embodiment.

FIG. 5 is a diagram illustrating the operation pattern 2 according to the first embodiment. While the operation pattern 1 is an operation pattern related to inter-base station signaling in the handover procedure, the operation pattern 2 is an operation pattern related to inter-base station signaling in a procedure different from the handover procedure.

As illustrated in FIG. 5, in step S21, the MEC base station 200a-1 transmits a message requesting for transmission of a message (described later) in step S22, to the MEC base station 200a-2. Such a message may be a Resource Status Request message inquiring about the load status in the MEC base station 200a-2. It should be noted that step S21 is not essential and can be omitted.

In step S22, the MEC base station 200a-2 transmits, to the MEC base station 200a-1 on the X2 interface, a message including at least one of the information indicating the processing capability of the MEC base station 200a-2 for the proxy process and the information indicating the processing load in the MEC base station 200a-2. Alternatively, when executing the proxy process in cooperation with the central MEC server 400, the MEC base station 200a-2 may transmit to the MEC base station 200a-1, the information c) in the operation pattern 1 according to the first embodiment, that is, information indicating the communication path to the central MEC server 400 and/or the processing capability of the central MEC server 400 for the proxy process. Such information is an example of switching information. In the operation pattern 2 according to the first embodiment, the controller 230 of the MEC base station 200a-2 corresponds to a notificator that notifies switching information.

The information indicating the processing capability of the MEC base station 200a-2 for the proxy process may be information indicating whether or not the MEC base station 200a-2 includes a functionality to execute the proxy process (that is, the MEC server 300-2) and may be a list of applications for which the MEC base station 200a-2 can execute the proxy process.

The information indicating the processing load in the MEC base station 200a-2 is, for example, information indicating the level of the load, corresponding to any one of the radio resource load, the communication load on the backhaul side, and the hardware load in the MEC base station 200a-1, as a result of the proxy process.

The message transmitted in step S22 is, for example, an X2 Setup Request message used by the MEC base station 200a-2 to request for the X2 interface to be set up between the MEC base station 200a-2 and the MEC base station 200a-1, an eNB Configuration Update message indicating configuration update in the MEC base station 200a-2, or a Resource Status Update message indicating a load status in the MEC base station 200a-2.

The MEC base station 200a-1 stores information notified from MEC base station 200a-2. The MEC base station 200a-1 refers to the stored information for the determination on handover (step S23). In step S23, the MEC base station 200*a*-1 determines whether or not to set the MEC base station 200*a*-2 to be the handover destination before the handover or at the time of the handover procedure, based on the stored information.

(1.3) First Modification of First Embodiment

For the operation patterns 1 and 2 according to the first embodiment described above, in the mobile communication system 1 illustrated in FIG. 1, a scenario is assumed in which the UE 100 in the RRC connected mode performs radio communication with the MEC base station 200*a*-1 (first node), and then the UE 100 is handed over from the MEC base station 200*a*-1 to the MEC base station 200*a*-2 (second node).

On the other hand, for a first modification of the first embodiment, in the mobile communication system 1 illustrated in FIG. 1, a scenario is assumed in which the UE 100 in the RRC idle mode selects a cell of the MEC base station 200*a*-1 (first node) as a serving cell, and then performs cell reselection to a cell of the MEC base station 200*a*-2 (second node). Such cell reselection is an example of a switching process for switching a proxy target node that executes a proxy process from the first node to the second node.

Figure 6:
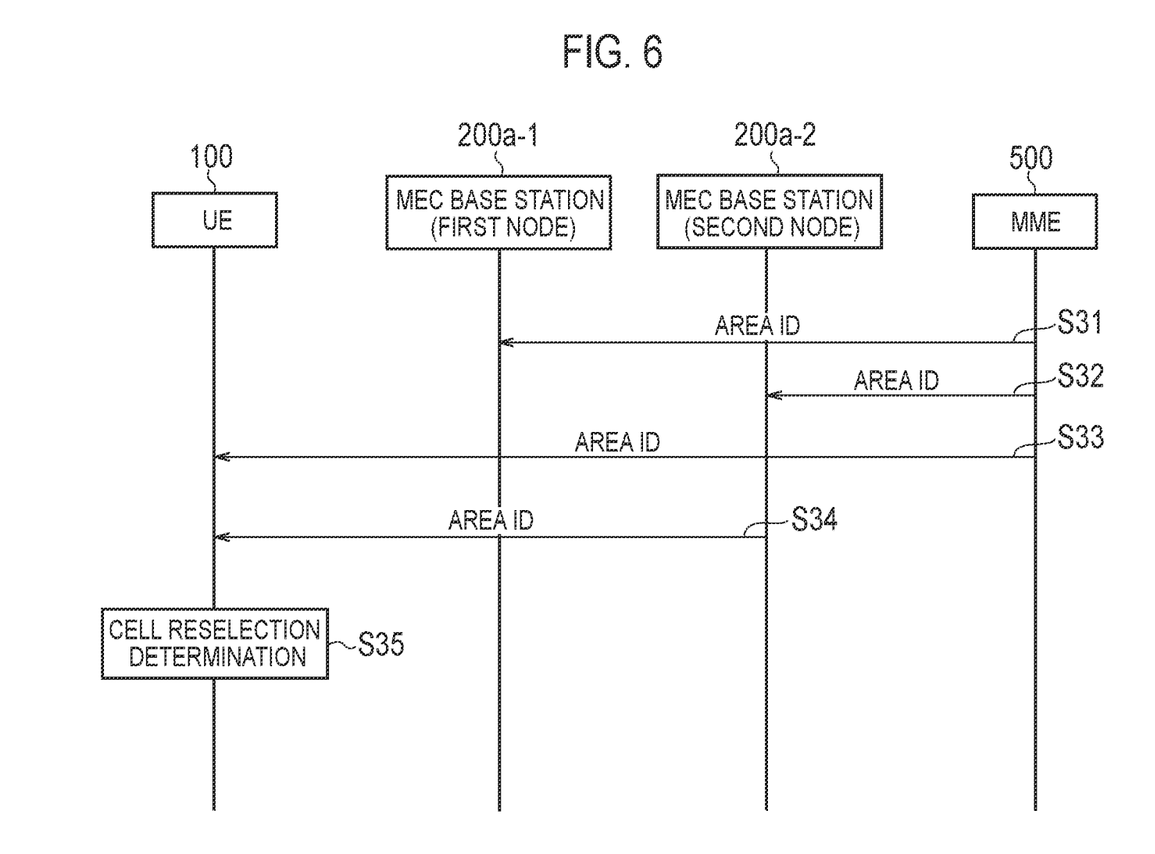
FIG. 6 is a diagram illustrating a first modification of the first embodiment.

FIG. 6 is a diagram illustrating the first modification of the first embodiment. FIG. 6 illustrates the MME 500 as a management apparatus that manages the MEC base station 200*a*-1 and the MEC base station 200*a*-1. However, the central MEC server 400 may be used instead of the MME 500. Preferably, the MME 500 knows applications that can be used by each of the UE 100, the MEC base station 200*a*-1, and the MEC base station 200*a*-2.

As illustrated in FIG. 6, in steps S31 and S32, the MME 500 assigns an area ID to the MEC base station 200*a*-1 and the MEC base station 200*a*-2. The area ID is information indicating an area formed by one or a plurality of nodes including the capability to execute a proxy process (that is, the MEC server 300). The MME 500 may assign an area ID for each application to a node capable of executing the proxy process. In such a case, the MME 500 may notify the MEC base station 200*a*-1 and the MEC base station 200*a*-2 of a set of application identification information and area ID. In the first modification of the first embodiment, the MME 500 includes a notificator that notifies an area ID as switching information. The MEC base station 200*a*-1 and the MEC base station 200*a*-2 to which the area ID has been assigned broadcast the assigned area ID by using a system information block (SIB). The UE 100 can receive the SIB thus broadcasted. Furthermore, the MEC base station 200*a*-1 and the MEC base station 200*a*-2 may broadcast, in addition to the area ID, identification information about an application for which the MEC base station or the central MEC server can execute the proxy process in the area, by using the SIB.

In step S33, the MME 500 notifies the UE 100 of the area ID using a NAS message. The MME 500 may notify the UE 100 of a set of application identification information and area ID. Thus, the UE 100 can know an area in which the proxy process can be executed for the application. Therefore, when the UE 100 is interested in executing the application or is executing the application, the UE 100 can select a cell of the MEC base station 200*a* belonging to an area in which the proxy process for the application can be executed.

In step S34, the UE 100 receives the area ID broadcasted from the MEC base station 200*a*-2. The UE 100 determines that the central MEC server 400 can execute the proxy process for the application via the MEC base station 200*a*-2 or the MEC base station 200*a*-2.

In step S35, the UE 100 determines to perform cell reselection from the cell of the MEC base station 200*a*-1 to the cell of the MEC base station 200*a*-2 based on the determination in step S34, and performs the cell reselection.

In the first modification example of the first embodiment, the MME 500 notifies the UE 100 of the area ID assigned to the MEC base station 200*a*-1 and the MEC base station 200*a*-2. However, this should not be construed in a limiting sense. The MME 500 may notify the UE 100 of a set application identification information and cell list. The cell list is a list of identification information pieces about respective cells of the MEC base station 200*a* capable of executing the proxy process for the application. The UE 100 can select a cell of the MEC base station 200*a* that can execute the proxy process for the application based on the cell list.

(1.4) Second Modification of First Embodiment

In an example mainly described in the above-described operation patterns 1 and 2 according to the first embodiment and the first modification of the first embodiment, the MEC base station 200*a* is integrated with the MEC server 300.

However, the base station 200 provided separately from the MEC server 300 may be used. In such a case, a concept of inter-MEC server handover may be introduced instead of the inter-base station handover. The inter-base station handover is for switching the radio connection (RRC connection) of the UE 100 from one base station to another base station. On the other hand, the inter-MEC server handover is for switching a proxy target node that executes the proxy process from one MEC server (first node) to another MEC server (second node). For example, the UE 100 may establish a radio connection with both the base station 200*a*-1 and the base station 200*a*-2 or establish a radio connection with only the base station 200*a*-1, and then perform the inter-MEC server handover to switch the proxy target node from the MEC server 300-1 to the MEC server 300-2. Note that, when the UE 100 has established the radio connection with the base station 200*a*-1 only, the inter-MEC server handover is implemented with the base station 200*a*-1 connected with the MEC server 300-1 and the MEC server 300-2 for implementing the inter-MEC server handover.

When the inter-MEC server handover is implemented, in the operation patterns 1 and 2 according to the first embodiment described above, the "MEC base station 200*a*-1" may be replaced with the "MEC server 300-1", the "MEC base station 200*a*-2" may be replaced with the "MEC server 300-2", and the "X2 interface" may be replaced with the "inter-MEC server interface".

(2) Second Embodiment

A second embodiment will be described while mainly focusing on differences from the first embodiment.

In the first embodiment described above, the proxy process is assumed to be executed. On the other hand, the second embodiment is an embodiment in which it is possible to select whether the calculation process of the application is executed by the UE 100 or the proxy process is executed by the proxy target node.

(2.1) Operation of Mobile Communication System (2.1.1) Operation Pattern 1

Figure 7:
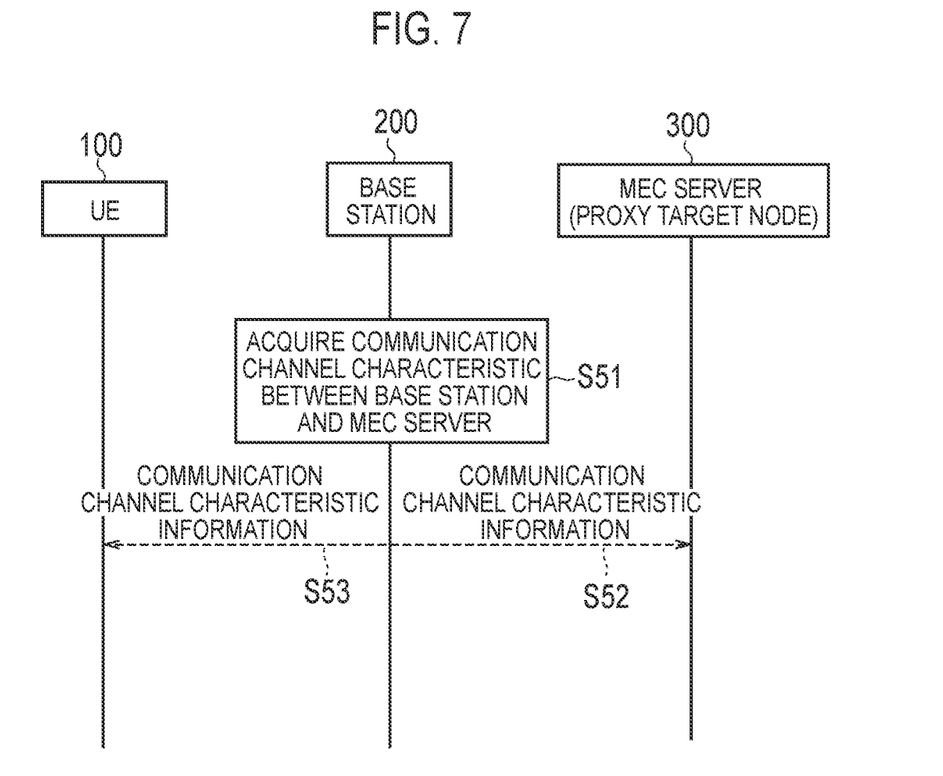
FIG. 7 is a diagram illustrating an example of an operation pattern 1 according to a second embodiment.

FIG. 7 is a diagram illustrating an example of an operation pattern 1 according to the second embodiment. The UE 100 is in the RRC connected mode. The base station 200 and the MEC server 300 are connected to each other via a predetermined interface.

As illustrated in FIG. 7, in step S51, the base station 200 acquires information indicating the characteristics of the communication channel between the base station 200 and the MEC server 300 (hereinafter, referred to as "communication channel characteristic information"). The communication channel characteristic information includes at least one of latency, throughput, congestion level (load status), packet loss rate, and retransmission execution rate. The latency and the throughput may be the maximum latency and the maximum throughput, or the minimum latency and the minimum throughput. The minimum latency and minimum throughput may be QoS guaranteed minimum latency and minimum throughput.

In step S52, the base station 200 notifies the MEC server 300 of the communication channel characteristic information acquired. The communication channel characteristic information notified from the base station 200 to the MEC server 300 may be information indicating downlink communication channel characteristics. The communication channel characteristic information is an example of selection information. In the operation pattern 1 according to the second embodiment, the controller 230 of the base station 200 corresponds to a notificator that notifies switching information.

The MEC server 300 selects, based on the notified communication channel characteristic information, whether the calculation process of the application used by the UE 100 is executed by the UE itself or the proxy process is executed by the MEC server 300. Alternatively, the MEC server 300 may select that the base station 200 executes the proxy process in addition to whether the proxy process is executed by the UE itself or the proxy process is executed by the MEC server 300. For example, the MEC server 300 selects to execute the proxy process when the communication channel characteristic information satisfies a preset threshold (for example, the communication channel characteristic between the base station 200 and the MEC server 300 is good). On the other hand, it is selected that the calculation process of the application is executed by the UE itself, when the communication channel characteristic information fails to satisfy the preset threshold (for example, the communication channel characteristic between the base station 200 and the MEC server 300 is no good). Such a threshold may be selectively set for each application. Alternatively, the base station 200 may notify the UE 100 of the threshold. The MEC server 300 may notify the UE 100 of information indicating the selection result.

Alternatively, instead of notifying the MEC server 300 of the communication channel characteristic information, or in addition to notifying the MEC server 300 of the communication channel characteristic information, the base station 200 may notify the UE 100 of the communication channel characteristic information.

In step S53, the base station 200 notifies the UE 100 of the communication channel characteristic information acquired. The UE 100 selects, based on the notified communication channel characteristic information, whether the calculation process of the application used by the UE 100 is executed by the UE itself or the proxy process is executed by the MEC server 300. For example, the UE 100 selects that the proxy process is executed by the MEC server 300 when the communication channel characteristic information satisfies a preset threshold (that is, the communication channel characteristic between the base station 200 and the MEC server 300 is good). On the other hand, it is selected that the calculation process of the application is executed by the UE itself, when the communication channel characteristic information fails to satisfy the preset threshold (that is, the communication channel characteristic between the base station 200 and the MEC server 300 is no good). Such a threshold may be selectively set for each application. The UE 100 may notify the MEC server 300 of information indicating the selection result. Note that, in the present embodiment, the UE 100 and/or the MEC server 300 selects, based on the notified communication channel characteristic information, whether the calculation process of the application used by the UE 100 is executed by the UE itself or the proxy process is executed by the MEC server 300. Alternatively, the base station 200 may select whether the calculation process is executed by the UE itself or the proxy process is executed by the MEC server 300, and notify the UE 100 and/or the MEC server 300 of the result. The UE 100 and/or the MEC server 300 may start the proxy process based on the selection result notified from the base station 200.

Furthermore, upon receiving the communication channel characteristic information from the base station 200 in S52, the MEC server 300 may transmit the communication channel characteristic between the MEC server 300 and the base station it acquired to the base station 200. Alternatively, the MEC server 300 may transmit the communication channel characteristic it acquired to the base station 200 before receiving the communication channel characteristic information from the base station. In such a case, the acquisition of the communication channel characteristic from the MEC server 300 by the base station 200 in step S51 may be omitted.

Figure 8:
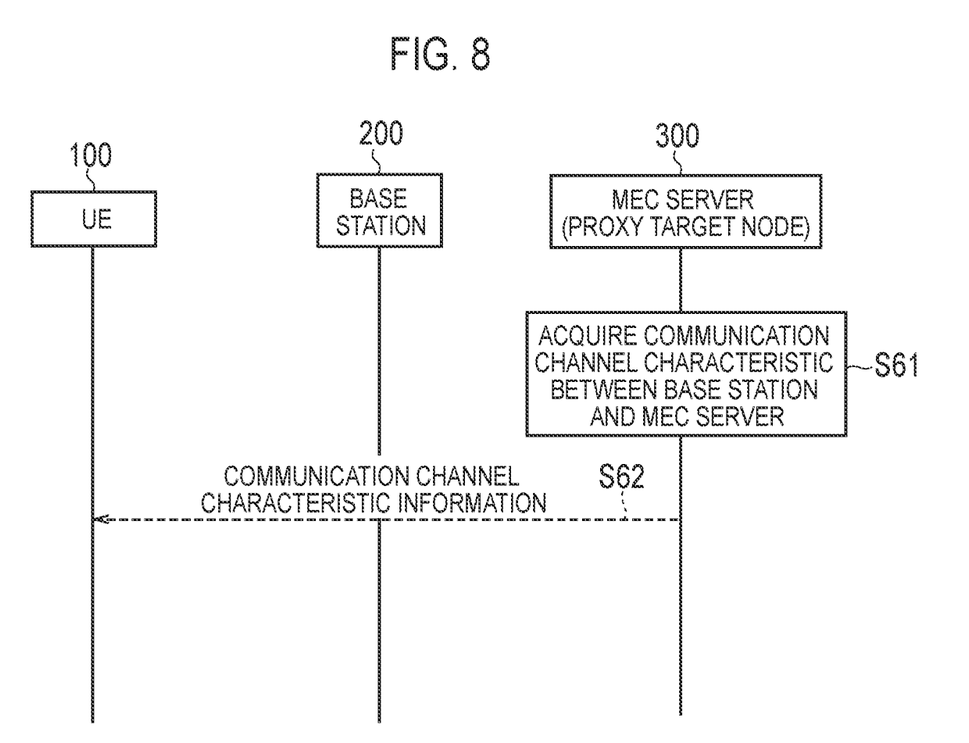
FIG. 8 is a diagram illustrating another example of the operation pattern 1 according to the second embodiment.

Although the communication channel characteristic information is notified from the base station 200 in the sequence in FIG. 7, the channel characteristic information may be notified from the MEC server 300. FIG. 8 is a diagram illustrating another example of the operation pattern 1 according to the second embodiment. Here, differences from the sequence in FIG. 7 will be described.

As illustrated in FIG. 8, in step S61, the MEC server 300 acquires communication channel characteristic information between the base station 200 and the MEC server 300.

In step S62, the MEC server 300 notifies the UE 100 of the communication channel characteristic information acquired, via the base station 200. In this sequence, the MEC server 300 has a notificator that notifies switching information. The UE 100 selects, based on the notified communication channel characteristic information, whether the calculation process of the application used by the UE 100 is executed by the UE itself or the proxy process is executed by the MEC server 300. Note that, instead of the selection by the UE, the base station 200 may select whether the calculation process of the application is executed by the UE itself or the proxy process is executed by the MEC server 300, and notify the UE 100 and/or the MEC server 300 of the result.

Note that, in the sequences of FIGS. 7 and 8, the UE 100 may be notified of the communication channel characteristic information acquired by the base station 200 or the MEC server 300, via the MME 500.

(2.1.2) Operation Pattern 2

In the operation pattern 2 according to the second embodiment, the UE 100 acquires information indicating the processing load of the calculation process of the application (hereinafter, referred to as "processing load information"), and notifies the MEC server 300 of the processing load information. The processing load includes a hardware load. Such processing load information may be an average value of the processing load or a maximum value of the processing load. Note that, as the information indicating the hardware load, a CPU clock frequency and/or a memory amount necessary for the proxy process may be used.

The MEC server 300 selects, based on the processing load information notified from the UE 100, whether the calculation process for the application used by the UE 100 is executed by the UE itself or the proxy process is executed by the MEC server 300. For example, when the processing load information satisfies a preset threshold value (that is, the processing load of the UE 100 is high), the MEC server 300 selects to execute the proxy process. On the other hand, when the processing load information fails to satisfy the preset threshold (that is, the processing load of the UE 100 is low), it is determined that the calculation process of the application is executed by the UE itself. Such a threshold may be selectively set for each application. The MEC server 300 may notify the UE 100 of information indicating the selection result.

Alternatively, the processing load information may be an amount of calculation process the UE 100 expects to be executed by the MEC server 300. In such a case, the MEC server 300 may determine the tolerable processing load for the proxy process based on the current load status of the MEC server 300, and determine that the MEC server 300 can execute the proxy process when the processing load information notified from the UE 100 does not exceed the tolerable processing load for the proxy process.

In the operation pattern 2 according to the second embodiment, the MEC server 300 may acquire the processing load information, and the MEC server 300 may notify the UE 100 of the processing load information. The UE 100 selects, based on the processing load information notified from the MEC server 300, whether the calculation process for the application used by the UE 100 is executed by the UE itself or the proxy process is executed by the MEC server 300. For example, when the processing load information satisfies a preset threshold (that is, the processing load of the MEC server 300 is high), the UE 100 selects to execute the calculation process of the application by the UE itself. On the other hand, when the processing load information fails to satisfy the preset threshold value (that is, the processing load of the MEC server 300 is low), it is selected that the MEC server 300 executes the proxy process. Such a threshold may be selectively set for each application. The UE 100 may notify the MEC server 300 of information indicating the selection result.

Note that transmission and reception of information between the UE 100 and the MEC server 300 may be performed indirectly via the MME 500.

In addition, the central MEC server 400 (or MME 500) may collect the communication channel characteristic information and/or the processing load information, select whether the calculation process of the application used by the UE 100 is executed by the UE itself or the proxy process is executed by the MEC server 300, and notify the UE 100 and the MEC server 300 of information indicating the selection result.

(3) Other Embodiments

Although the embodiments have been described above, it should not be understood that the description and drawings forming part of this disclosure limit the present invention. From this disclosure, various alternative embodiments, examples, and operation techniques will be apparent to those skilled in the art.

In the embodiments described above, the LTE system has been exemplified as the mobile communication system. However, the present disclosure is not limited to LTE systems. The operation according to the above-described embodiments may be applied to a mobile communication system other than the LTE system (for example, a 5th generation mobile communication system). In the 5th generation mobile communication system (new RAT (NR)), an apparatus called access and mobility management function (AMF) is used instead of the MME. In a case assuming the 5th generation mobile communication system, "MME" in the above-described embodiment may be read as "AMF".

A program that causes a computer to execute the processes according to the above-described embodiments may be provided. Furthermore, the program may be recorded on a computer-readable medium. With the computer-readable medium, it is possible to install the program on a computer. Here, the computer-readable medium on which the program is recorded may be a non-transitory recording medium. The non-transitory recording medium is not particularly limited, but may be, for example, a recording medium such as a CD-ROM or a DVD-ROM. A chipset including: a memory for storing a program for executing each process executed by the UE 100 and the eNB 200; and a processor for executing the program stored in the memory may be provided.

The invention claimed is:

1. A mobile communication system comprising:
    a user equipment configured to perform a radio communication with a mobile communication network;
    a plurality of nodes including a proxy target node provided on the mobile communication network and configured to execute a proxy process of executing a calculation process of an application used by the user equipment on behalf of the user equipment;
    a first node including a notificator configured to notify at least one of a second node and the user equipment of switching information used for a switching process of switching the proxy target node from the first node to the second node; and
    a management apparatus configured to manage the plurality of nodes, wherein
    the switching information includes at least one of information indicating a communication path to the management apparatus and information indicating a processing load of the proxy process in the first node.

2. The mobile communication system according to claim 1, wherein
    the switching information further includes information indicating the application, and
    the notificator is configured to notify the second node of the switching information.

3. The mobile communication system according to claim 1, further comprising
    a management apparatus configured to manage the plurality of nodes, wherein
    the notificator is configured to notify the second node of the switching information.

4. The mobile communication system according to claim 1, wherein
    the switching information includes the information indicating the communication path to the management apparatus.

5. The mobile communication system according to claim 1, wherein
the switching information includes the information indicating the processing load of the proxy process in the first node.

6. The mobile communication system according to claim 1, wherein
the switching information includes the information indicating the communication path to the management apparatus and the information indicating the processing load of the proxy process in the first node.

7. An apparatus used in a mobile communication system, the mobile communication system including a user equipment configured to perform a radio communication with a mobile communication network, a plurality of nodes including a proxy target node provided on the mobile communication network and configured to execute a proxy process of executing a calculation process of an application used by the user equipment on behalf of the user equipment, and a management apparatus configured to manage the plurality of nodes, the apparatus comprising
a notificator, included in a first node, and configured to notify at least one of a second node and the user equipment of switching information used for a switching process for switching the proxy target node from the first node to the second node, the switching information including at least one of information indicating a communication path to the management apparatus and information indicating a processing load of the proxy process in the first node.

8. The apparatus used in a mobile communication system according to claim 7, wherein
the switching information includes the information indicating the communication path to the management apparatus.

9. The apparatus used in a mobile communication system according to claim 7, wherein
the switching information includes the information indicating the processing load of the proxy process in the first node.

10. The apparatus used in a mobile communication system according to claim 7, wherein
the switching information includes the information indicating the communication path to the management apparatus and the information indicating the processing load of the proxy process in the first node.

11. A mobile communication system comprising:
a user equipment configured to perform a radio communication with a mobile communication network;
a proxy target node provided on the mobile communication network and configured to execute a proxy process of executing a calculation process of an application used by the user equipment on behalf of the user equipment;
a notificator configured to notify at least one of the proxy target node and the user equipment of selection information used for selecting whether the calculation process is executed by the user equipment or the proxy process is executed by the proxy target node; and
a management apparatus configured to manage a plurality of nodes, wherein
a first node includes the notificator, and
the notificator is configured to notify at least one of a second node and the user equipment of switching information used for a switching process of switching the proxy target node from the first node to the second node, the switching information including at least one of information indicating a communication path to the management apparatus and information indicating a processing load of the proxy process in the first node.

12. The mobile communication system according to claim 11, further comprising
a base station provided on the mobile communication network, wherein
the proxy target node is an apparatus different from the base station, and
the selection information includes information indicating a characteristic of a communication channel between the base station and the proxy target node.

13. The mobile communication system according to claim 11, wherein the selection information includes information indicating a processing load of the calculation process.

14. The mobile communication system according to claim 11, wherein
the switching information includes the information indicating the communication path to the management apparatus.

15. The mobile communication system according to claim 11, wherein
the switching information includes the information indicating the processing load of the proxy process in the first node.

16. The mobile communication system according to claim 11, wherein
the switching information includes the information indicating the communication path to the management apparatus and the information indicating the processing load of the proxy process in the first node.

* * * * *